(12) United States Patent
Kawabuchi et al.

(10) Patent No.: US 7,795,832 B2
(45) Date of Patent: Sep. 14, 2010

(54) ROBOT HAND

(75) Inventors: Ichiro Kawabuchi, Tokyo (JP); Kiyoshi Hoshino, Tsukuba (JP)

(73) Assignee: Japan Science and Technology Agency, Kawaguchi-shi, Saitama (JP)

( * ) Notice: Subject to any disclaimer, the term of this patent is extended or adjusted under 35 U.S.C. 154(b) by 651 days.

(21) Appl. No.: 10/599,510

(22) PCT Filed: Mar. 31, 2005

(86) PCT No.: PCT/JP2005/006403

§ 371 (c)(1),
(2), (4) Date: May 14, 2007

(87) PCT Pub. No.: WO2005/095066

PCT Pub. Date: Oct. 13, 2005

(65) Prior Publication Data

US 2007/0236162 A1    Oct. 11, 2007

(30) Foreign Application Priority Data

Mar. 31, 2004   (JP) .............................. 2004-107754

(51) Int. Cl.
  *B25J 15/12* (2006.01)
(52) U.S. Cl. ............................ 318/568.11; 318/568.16; 318/568.21; 901/38
(58) Field of Classification Search ............ 318/568.11, 318/568.16, 568.17, 568.18, 568.2, 568.21; 901/30–35, 38; 294/104, 106, 110.1, 137
See application file for complete search history.

(56) References Cited

U.S. PATENT DOCUMENTS

| | | | | |
|---|---|---|---|---|
| 5,447,403 A | * | 9/1995 | Engler, Jr. ...................... | 414/4 |
| 5,570,920 A | * | 11/1996 | Crisman et al. ............. | 294/111 |
| 6,236,037 B1 | * | 5/2001 | Asada et al. ................. | 250/221 |
| 6,606,540 B1 | * | 8/2003 | Gross ......................... | 700/258 |
| 6,918,622 B2 | * | 7/2005 | Kim et al. ................... | 294/106 |
| 7,059,645 B2 | * | 6/2006 | Kameda et al. ............. | 294/106 |
| 7,077,446 B2 | * | 7/2006 | Kameda et al. ............. | 294/106 |

FOREIGN PATENT DOCUMENTS

| | | |
|---|---|---|
| JP | 05-337860 | 12/1993 |
| JP | 06-24885 | 4/1994 |
| JP | 11-156778 | 6/1999 |
| JP | 2003-117873 | 4/2003 |

* cited by examiner

*Primary Examiner*—Bentsu Ro
(74) *Attorney, Agent, or Firm*—Benesch Friedlander Coplan & Aronoff, LLP

(57) ABSTRACT

A robot hand equipped with a function of gently pinching an object may include a single degree of freedom joint for allowing bending or stretching at a connecting portion between a distal phalange section and a middle phalange section. The robot hand may further include a driving mechanism for causing this joint to make a rotating motion within a predetermined angular range. This driving mechanism is constituted by a motor and a speed reducer. The joint and the driving mechanism are configured so that the distal phalange section is rotated relative to the middle phalange section in two directions, namely, an inward direction and an outward direction within the predetermined angular range from a state where the distal phalange section is arranged in a straight line with the middle phalange section.

7 Claims, 12 Drawing Sheets

ROBOT HAND

TECHNICAL FIELD

The present invention relates to a robot hand including a plurality of finger mechanisms corresponding to a plurality of human fingers, respectively.

BACKGROUND ART

In a robot hand disclosed in Japanese Patent Application Laid-Open Publication No. 117873/2003, by appropriately selecting a degree of freedom of each of the finger mechanisms, an operation close to a human finger is implemented. As a result, it has become possible for the robot hand, which is compact and lightweight, to firmly grasp even a heavy object.

Patent Document 1: Japanese Patent Application Laid-Open Publication No. 117873/2003

DISCLOSURE OF THE INVENTION

Problem to be Solved by the Invention

However, though the conventional robot hand can exhibit the function of firmly grasping the heavy object, the conventional robot hand cannot exhibit a function of gently (softly) and stably pinching a small object, a thin object, nor a fragile object, yet. It is because only an electric motor is currently employed as an actuator for driving the robot hand. Then, when the robot hand is to be formed to have dimensions and a shape close to those of a human being, it is unavoidable to limit the number of motors and speed reducers which can be included in the robot hand. Hence, it is difficult to implement a degree of freedom of a motion expected for the robot hand so as to gently pinch the thin object and the like. In order to cause the robot hand to gently and stably pinch the thin object and the like by increasing the degree of freedom of the motion of each finger mechanism, dimensions of the motors to be included in the robot hand should be reduced, and the greatest possible number of motors should be included, in theory. However, a reduction ratio of a speed reducer must be increased in order to derive a large torque from a small motor. Accordingly, rattle of a driving mechanism and friction loss of the driving mechanism will increase, and force controllability of the robot hand will therefore deteriorate.

An object of the present invention is to provide a robot hand that can gently and stably pinch a small object, a thin object, a fragile object, and the like.

Other object of the present invention is to provide a robot hand that can gently and stably pinch a thin object and the like, even if a degree of freedom of a motion of each finger mechanism therein is small and even if the number of motors and speed reducers included therein is small.

Still other object of the present invention is to provide a robot hand that can achieve the objects described above, using speed reducers of a simple structure.

MEANS FOR SOLVING THE PROBLEM

A robot hand targeted for improvement by the present invention is the robot hand that includes a plurality of finger mechanisms corresponding to a plurality of human fingers, respectively and in which each of the finger mechanisms is constituted by a plurality of phalange sections including a distal phalange section and a middle phalange section adjacent to the distal phalange section. The robot hand of the present invention includes a fingertip rotating mechanism that causes the distal phalange section to rotate relative to the middle phalange section in two directions, namely, an inward direction and an outward direction, within a predetermined angular range from a state where the distal phalange section is arranged in a straight line the middle phalange section. With such an arrangement, an object can be pinched while the distal phalange section is bent outward with respect to the middle phalange section. Thus, the object can be pinched stably with the finger palm-side portion of the distal phalange section extensively applied to a surface of the object to be held.

The fingertip rotating mechanism includes at a connecting portion between the distal phalange section and the middle phalange section a single degree of freedom joint for allowing bending or stretching and also includes a driving mechanism that causes the joint to make a rotating motion within the predetermined angular range. Then, the joint and the driving mechanism are configured so that the distal phalange section can be rotated relative to the middle phalange section in the two directions, namely, the inward direction and the outward direction, within the predetermined angular range from the state where the distal phalange section is arranged in a straight line with the middle phalange section. With such an arrangement, an amount of bending the distal phalange section can be adjusted. Thus, when an object is pinched, a force to be applied to the object can be distributed with both of the finger palm-side portions of the distal and middle phalange sections being in contact with the object, and the object can be then pinched. As a result, the force to be applied to the object to be held can be reduced more than with a conventional robot hand or can be distributed. A small object, a thin object, and a fragile object that could not be pinched conventionally can be pinched stably according to the present invention.

The driving mechanism described before may be constituted by a motor for driving the joint and a speed reducer. The motor for driving the joint is included in the middle phalange section and generates a driving force for rotating the joint. The speed reducer reduces a speed of the motor and transmits the reduced speed to the joint. A rotational force required for the distal phalange section is small, and the rotational force as described above can be obtained by the driving mechanism constituted by the motor and the speed reducer. Since the driving mechanism can be formed to be compact, the driving mechanism can be readily included in the middle phalange section. The driving mechanism can readily perform force control for applying minute force to the tip of each finger.

A robot hand of the present invention in particular may be configured to include five finger mechanisms corresponding to first through fifth fingers of a human being and a palm portion which supports the five finger mechanisms and corresponds to a palm of the human being. Then, it may be so arranged that each of the five finger mechanisms corresponding to the first through fifth fingers, respectively, includes a distal phalange section, a middle phalange section, and a proximal phalange section, in order from a fingertip thereof, at least a single degree of freedom joint for allowing bending or stretching at a connecting portion between the distal phalange section and the middle phalange section, and a driving mechanism that causes the joint to perform a rotating motion within a predetermined angular range. With such an arrangement, even if the present invention is applied to a humanoid robot hand, an object can be pinched by the humanoid robot hand while the distal phalange section is bent outward with respect to the middle phalange section. Accordingly, the humanoid robot hand can be implemented that can stably pinch an object to be held with the palm-side portion of the distal phalange section extensively applied to a surface of the object.

Speed reducers of various structures can be employed as the speed reducer that can be used in the driving mechanism. However, it is particularly preferable that the speed reducer is constituted by a first pinion gear fixed to an output shaft of the motor; a first spur gear that is fixed to a rotary shaft rotatably supported by the middle phalange section and meshes with the first pinion gear; a second pinion gear fixed to the rotary shaft; and a second spur gear that is fixed to the distal phalange section so that the rotation center of the joint becomes the rotation center of the second spur gear and meshes with the second pinion gear. With this arrangement, the speed reducer can be formed to be compact. In addition, since friction loss within the driving mechanism is small, a force to be applied to an object from the distal phalange section can be adjusted in a more minute range than in the conventional art. Further, since a high speed reduction ratio can be obtained with a simple structure, a high torque can be obtained even from a small motor. As a result, force control that applies minute force to the tip of each finger becomes possible.

Structures of the distal and middle phalange sections are arbitrary. When each of the distal and middle phalange sections has first and second side wall portions that face to each other in a width direction of each of the distal and middle phalange sections and the joint is provided so that the first and second side wall portions of the distal phalange section and the first and second side wall portions of the middle phalange sections are rotatably connected, for example, it is preferable that the driving mechanism is configured as follows. First, the motor is arranged between the first and second sidewall portions of the middle phalange section so that an axis line of the output shaft extends in the width direction of the middle phalange section. Then, an axis line of the rotary shaft that supports the first spur gear and the rotation center line of the second spur gear both become parallel to the axis line of the output shaft. Moreover, the first spur gear is arranged to be along the first side wall portion of the middle phalange section located in a direction where the output shaft of the motor protrudes, and the second spur gear is arranged to be along the first side wall portion of the distal phalange section. With this arrangement, not only the motor can be accommodated within the robot hand compactly, but also it becomes possible that the first and second spur gears are provided outside the robot hand without being bulky. The driving mechanism can be thus accommodated using a space inside the robot hand, and downsizing of the robot hand thereby becomes possible.

The output shaft of the motor may be rotatably supported by the first side wall portion of the middle phalange section, and a housing for the motor may be supported by the second side wall portion of the middle phalange section. Then, the rotary shaft may be supported by the first side wall portion of the middle phalange section, and the second spur gear may be fixed to the first side wall portion of the distal phalange section. With this arrangement, an extra component does not need to be prepared for fixing the motor, and a space occupied by the speed reducer can also be more reduced.

A rotational position detecting sensor (such as a potentiometer) that detects a rotational position of the distal phalange section may be attached to the second side wall portion of the middle phalange section. With this arrangement, a rotational angle of the distal phalange section relative to the middle phalange section can be measured. Control over a degree of pinching of an object is thereby facilitated.

A pressure sensor for measuring a contact pressure distribution may be attached to an outer surface of a palm-side portion of the distal phalange section. With this arrangement, a pressure applied from the distal phalange section to an object when the robot hand pinches the object can be measured. Accordingly, control over a degree of pinching by the tip of a finger can be performed according to the measured pressure.

The robot hand of the present invention may be configured to include a rotation driving mechanism that causes a first finger mechanism corresponding to a human thumb among the finger mechanisms to rotate by a predetermined angle about a center line extending in a direction where the phalange sections constituting the first finger mechanism are arranged so that the first finger mechanism fully faces the other finger mechanism. With this arrangement, rotation of the rotary joint can causes the palm-side portion of the distal or middle phalange section of the finger mechanism for the first finger to fully face the palm-side portion of the distal or middle phalange section of other finger mechanism. As a result, when an object is pinched by the finger mechanism for the first finger and the other finger mechanism, a contact area can be increased. The object can be thereby pinched stably and with reliability.

The first finger mechanism of the robot hand of the present invention may be configured to include the distal phalange section, the middle phalange section, and a proximal phalange section in order from a fingertip thereof. Then, the proximal phalange section may include a first proximal phalange half portion and a second proximal phalange half portion which are formed by dividing the proximal phalange section so the first and second proximal phalange half portions may be located in a direction where the proximal phalange section and the metacarpal section are arranged. It is configured that the first proximal phalange half portion is located on a side of the metacarpal section, and that the second proximal phalange half portion is located on a side of the middle phalange section. In this case, between the first proximal phalange half portion and the second proximal phalange half portion, a single degree of freedom rotary joint is included. The rotary joint allows the second proximal phalange half portion to rotate relative to the first proximal phalange half portion within the predetermined angular range so that the second proximal phalange half portion may rotate about the center line passing through the center of the first proximal phalange half portion and the center of the second proximal phalange half portion. Then, a driving mechanism for driving the rotary joint that causes the rotary joint to make a rotating motion within the predetermined angular range is included. With this arrangement, when an object is pinched by the finger mechanism for the first finger and other finger mechanism, a contact area can be increased. The object can be thereby pinched stably and with reliability.

The driving mechanism for driving the rotary joint of the present invention may be constituted by a motor for driving the rotary joint that is attached to the first proximal phalange half portion and generates a driving force for rotating the rotary joint; and a speed reducer that reduces a speed of the motor and transmits the reduced speed to the rotary joint. Then, the speed reducer may comprise: a first pinion gear fixed to an output shaft of the motor; a first spur gear that is fixed to a rotary shaft rotatably supported by the first proximal phalange half portion and meshes with the first pinion gear; a second pinion gear fixed to the rotary shaft; and a second spur gear that is fixed to the second proximal phalange half portion so that the rotation center of the rotary joint becomes the rotation center of the second spur gear and meshes with the second pinion gear. With this arrangement, the driving mechanism can be formed by the small number of components, and a necessary torque can also be obtained using the motor of a compact type.

BEST MODE FOR CARRYING OUT THE INVENTION

Figure 1A:
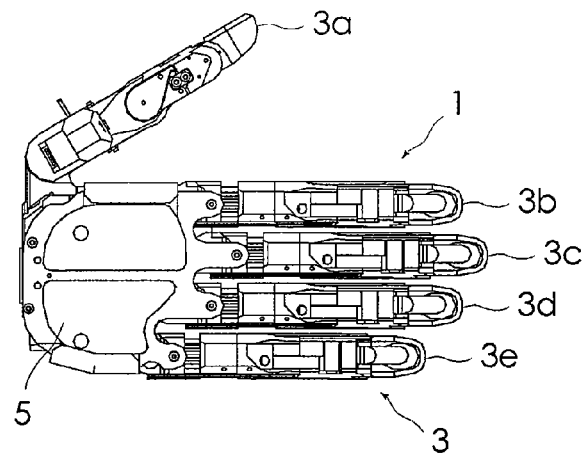
FIG. 1A is a front view showing an outward appearance of a robot hand according to an embodiment of the present invention.
Figure 1B:
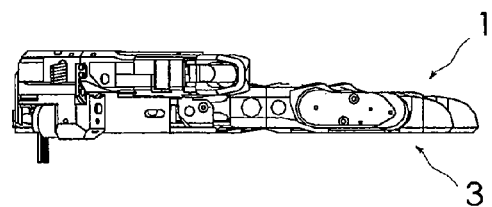
FIG. 1B is a plan view of FIG. 1A.
Figure 1C:
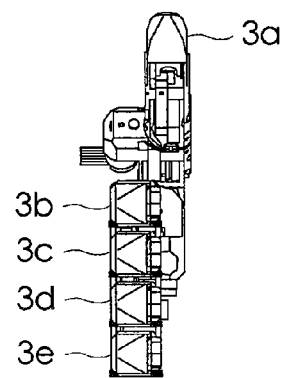
FIG. 1C is a side view of FIG. 1A.
Figure 2:
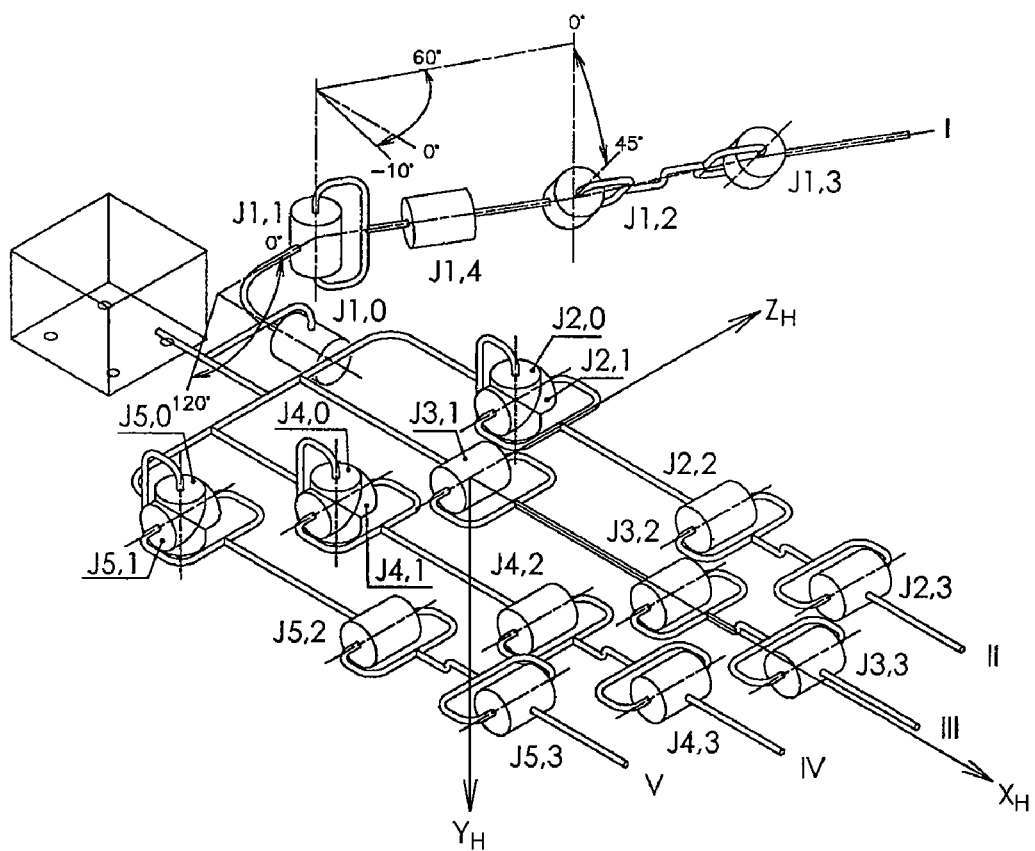
FIG. 2 is a perspective view showing how joints of the robot hand are arranged in the embodiment of the present invention.

Embodiments to which the present invention has been applied to a humanoid robot hand will be described below in detail with reference to drawings. FIG. 1A is a front view showing an outward appearance of the robot hand in an embodiment, FIG. 1B is a plan view of the robot hand of FIG. 1A, and FIG. 1C is a side view of the robot hand of FIG. 1A. FIG. 2 is a diagram showing arrangement and nominal designations of all of 20 rotary joints provided at bending/stretching portions of the robot hand shown in FIG. 1. In the following description, five finger mechanisms corresponding to first to fifth fingers of a human being, respectively, are described as first to fifth fingers, for convenience in description. A robot hand 1 shown in FIG. 1 has first to fifth fingers ($3a$ to $3e$). As shown in FIG. 2, joints $J1,0$ to $J1,4$, joint $J2,0$ to $J2,3$, joint $J3,1$ to $J3,3$, joint $J4,0$ to $J4,3$, and joint $J5,0$ to $J5,3$ are arranged at the first to fifth fingers of the robot hand, respectively. Then, it is so configured that using these joint portions, each finger can make a bending or stretching motion, a motion of gently (softly) and stably pinching an object to be held (hereinafter referred to as a pinching motion) (details of which will be described later), or an opening or closing motion between fingers (hereinafter referred to as an abduction motion). Since a joint portion (a proximal phalange section which will be described later) of the third finger does not need to be rotated laterally, a joint $3,0$ for abduction is omitted, as shown in FIG. 2. Since the bending or stretching motion and the abduction motion are described in Japanese Patent Application Laid-Open Publication: No. 117873/2003 in detail, descriptions of the bending or stretching motion and the abduction motion will be omitted.

Before the embodiment of the present invention is described, the finger mechanisms for the second to fifth fingers for implementing the embodiment will be described. Since the first finger has a structure greatly different from those of the other four fingers and the first finger makes a motion different from those of the other four fingers, the structure of the first finger will be described later.

Figure 3A:
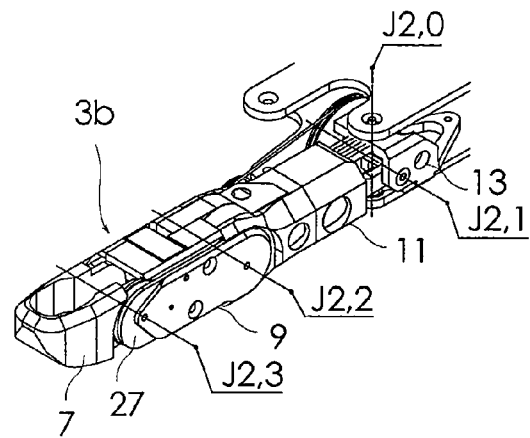
FIG. 3A is a perspective view of a second finger.
Figure 3B:
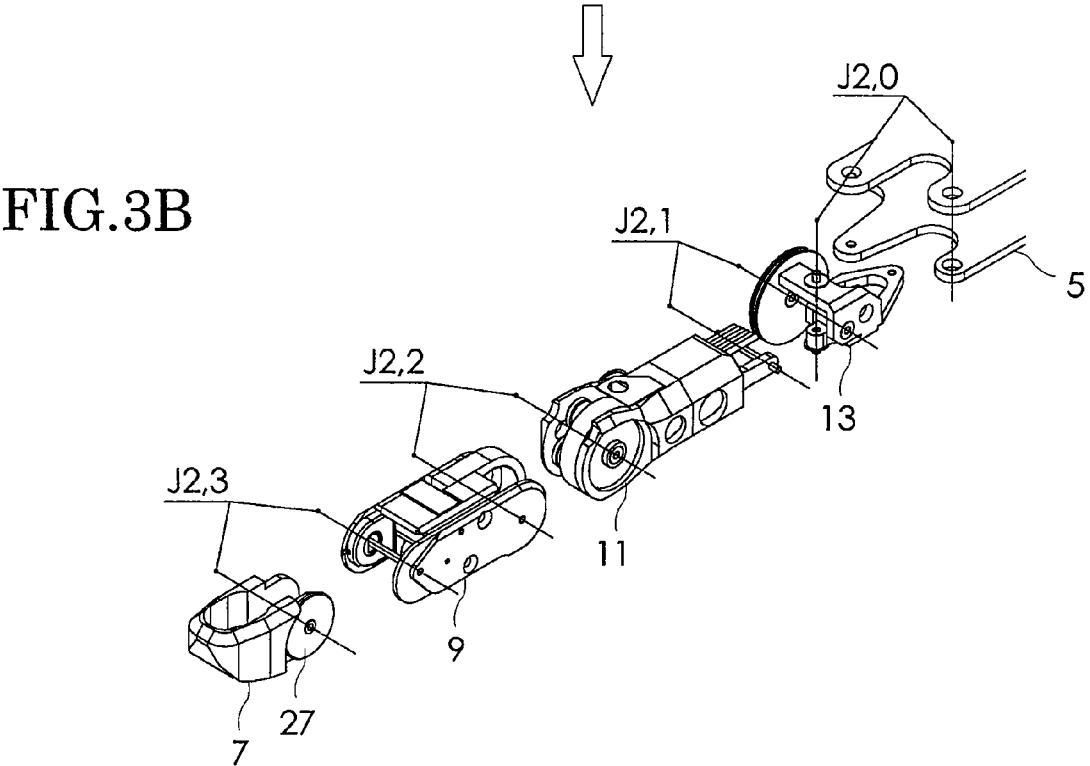
FIG. 3B is an exploded view in which an internal mechanism shown in FIG. 3A is omitted.

Each of the second to fifth fingers is constituted by four phalange sections and is structured so that each of the second to fifth fingers can bend or stretch at each of the joint portions thereof. FIG. 3A shows a perspective view of the second finger as a typical example, and FIG. 3B shows an exploded view of the second finger that has omitted an internal mechanism of the second finger. As shown in this drawing, the second finger includes a distal phalange section 7, a middle phalange section 9, a proximal phalange section 11, and a metacarpal section 13 in order from the tip of the finger. Though shapes of the respective metacarpal sections 13 of the second to fifth fingers are slightly different, the differences are not the ones of which the description must be changed greatly. Thus, the second finger will be picked up as a representative, and the mechanism of the second finger will be hereinafter described. Then, descriptions of the same phalange sections of the other third to fifth fingers will be omitted.

Figure 4A:
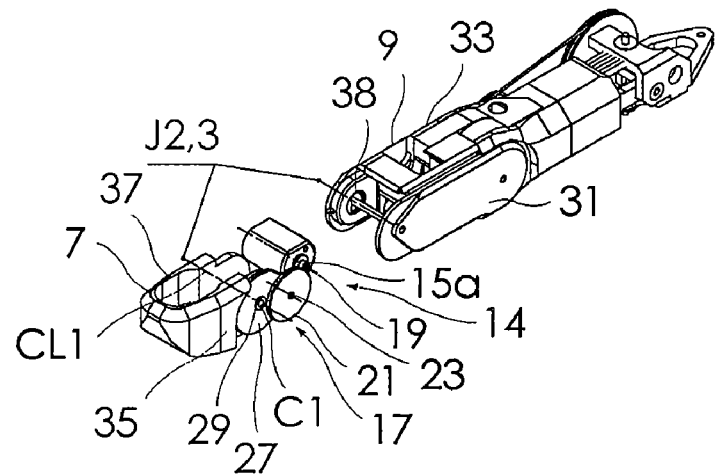
FIG. 4A is a perspective view in which a distal phalange section of the second finger and a middle phalange section of the second finger are exploded.
Figure 4B:
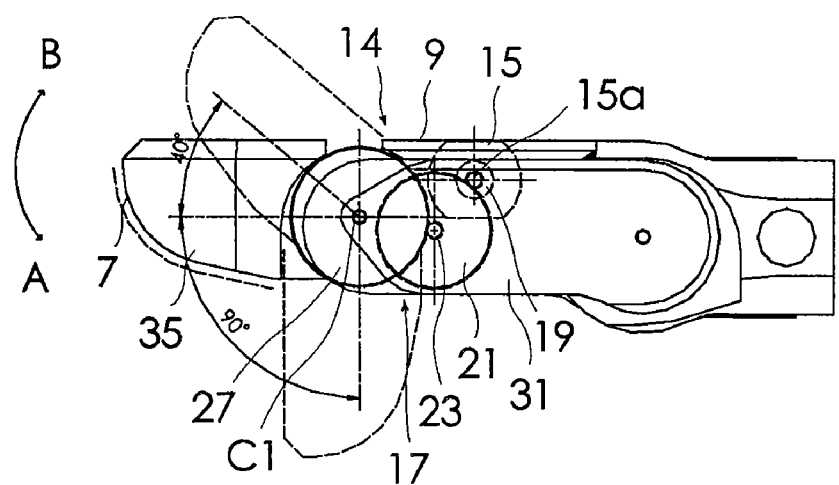
FIG. 4B is a diagram showing a motion of the distal phalange section of the second finger using a driving mechanism including a speed reducer.
Figure 4C:
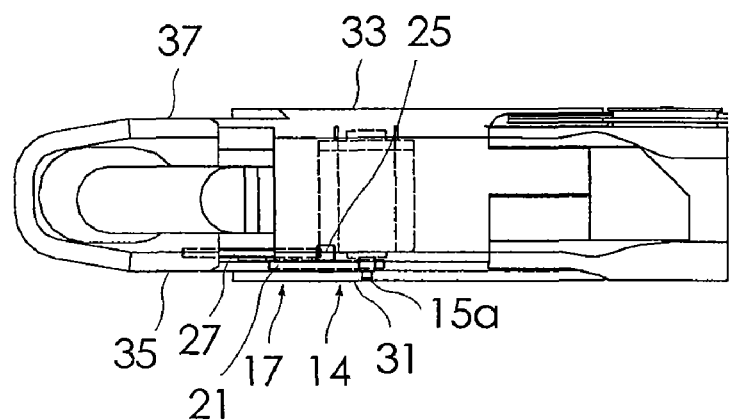
FIG. 4C is a plan view of the distal phalange section of the second finger and the middle phalange section of the second finger, in which the driving mechanism is shown in a broken line.
Figure 4D:
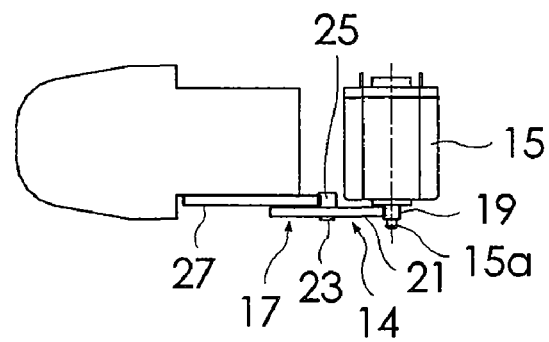
FIG. 4D is a diagram showing a relationship between the driving mechanism of the second finger and the distal phalange section of the second finger.

A finger joint driving mechanism for the joint $J2,3$ that connects the distal phalange section 7 and the middle phalange section 9 will be described with reference to FIGS. 3A, 3B, 4A, and 4B. FIG. 4A is a perspective view in which the distal phalange section of the second finger and the middle phalange section of the second finger are exploded. FIG. 4B is a diagram to be used for explaining a motion of the distal phalange section using the driving mechanism including a speed reducer. FIG. 4C is a plan view of the distal phalange section of the second finger and the middle phalange section of the second finger, in which the driving mechanism is shown in a broken line. FIG. 4D is a diagram to be used for explaining the driving mechanism for the distal phalange section of the second finger.

In this embodiment, the joint $J2, 3$ of a single degree of freedom for allowing bending or stretching is included at a connecting portion of the distal phalange section 7 and the middle phalange section 9, and a driving mechanism 14 that causes this joint to make a rotating motion within a predetermined angular range is included. This driving mechanism 14 is constituted by a motor 15 for driving the joint which is included in the middle phalange section 9 and generates a driving force for rotating the joint $J2, 3$, and a speed reducer 17 which reduces a speed of the motor 15 and transmits the reduced speed to the joint $J2, 3$. As the motor 15, a DC motor which is compact and lightweight, which can be positive reverse rotated, and over which torque control is easy is employed in order to obtain sufficient performance for implementing minute force control over the tip of the finger.

The joint J2,3 and the driving mechanism 14 are formed so that the distal phalange section 7 can be rotated relative to the middle phalange section 9 in two directions, namely, an inward direction (a direction A indicated by an arrow in FIG. 4B) and an outward direction (a direction B indicated by an arrow in FIG. 4B), within the predetermined angular range from a state where the distal phalange section 7 is arranged in a straight line with the middle phalange section 9. In this embodiment, it is arranged that the distal phalange section 7 is rotated outwardly by approximately 40 degrees and inwardly by approximately 90 degrees in this state. With this arrangement, rotation of the connecting portion between the distal phalange section 7 and the middle phalange section 9 can be controlled independently, and force control that provides a minute force to the tip of the finger can be thereby performed.

In this embodiment, the speed reducer 17 in particular is constituted from a first pinion gear 19 fixed to an output shaft 15a of the motor 15, a first spur gear 21 that is fixed to a rotary shaft 23 rotatably supported by the middle phalange section 9 and meshes with the first pinion gear 19, a second pinion gear 25 fixed to the rotary shaft 23, and a second spur gear 27 that is fixed to the distal phalange section 7 so that a rotation center C1 of the joint J2,3 becomes the rotation center of the second spur gear 27 and meshes with the second pinion gear 25. The first pinion gear 19 and the second pinion gear 25 become the smallest possible gears each having the substantially the smaller number of teeth than the first spur gear 21 and the second spur gear 27. By adopting configurations having these numbers of teeth, a reduction ratio can be increased, and speed reduction can also be achieved efficiently. For this reason, when this embodiment is adopted, a high speed reduction ratio can be obtained with a simple structure. Thus, a high torque can be obtained even with one compact motor. As a result, the force control that efficiently gives minute force to the tip of the finger can be performed. A motion of the tip of the finger closer to a human being thus can be implemented.

In this embodiment, the distal phalange section 7 includes a first side wall portion 35 and a second side wall portion 37 that face to each other in a width direction thereof, and the middle phalange section 9 includes a first side wall portion 31 and a second side wall portion 33 that face to each other in a width direction thereof. The joint J2,3 is provided so that the first side wall portion 35 of the distal phalange section 7, the second side wall portion 37 of the distal phalange section 7, the first side wall portion 31 of the middle phalange section 9, and the second side wall portion 33 of the middle phalange section 9 are rotatably connected. The motor 15 is arranged between the first side wall portion 31 of the middle phalange section 9 and the second side wall portion 33 of the middle phalange section 9 so that an axis line of the output shaft 15a extends in the width direction thereof. The first spur gear 21 and the second spur gear 27 are arranged so that an axis line of the rotary shaft 23 that supports the first spur gear 21 and a rotation center line CL1 of the second spur gear 27 are both parallel to the axis line of the output shaft 15a. The first spur gear 21 is arranged along the first side wall portion 31 of the middle phalange section 9 located in a direction in which the output shaft 15a of the motor 15 protrudes. The second spur gear 27 is arranged so as to be along the first side wall portion 35 of the distal phalange section 7. When the first pinion gear 19 and the first spur gear 21 are provided to be along the first side wall portion 31, and when the second pinion gear 25 and the second spur gear 21 are provided to be along the first side wall portion 31 as described above, spaces within the middle phalange section 9 and the distal phalange section 7 become wider. The size of the motor 15 thus can be increased. In this embodiment, the second spur gear 27 is located outside the first sidewall portion 35. In the first sidewall portion 31 of the middle phalange section 9, the first pinion gear 19 and the first spur gear 21 are arranged, and outside the first sidewall portion 35 of the distal phalange section 7, the second pinion gear 25 and the second spur gear 27 are arranged. However, if spaces within the middle phalange section 9 and the distal phalange section 7 can be secured, the second spur gear 27 may be of course arranged inside the first side wall portion 35 of the distal phalange section 7. By adopting the embodiment described above, not only the motor 15 can be accommodated in a compact form within the robot hand, but also the speed reducer 17 can be provided within the robot hand without being bulky. Thus, an available space that can be utilized for the motor, a sensor and wiring within the robot hand can be secured. Downsizing of the robot hand can be thereby achieved.

More specifically, the output shaft 15a of the motor 15 is rotatably supported by the first side wall portion 31 of the middle phalange section 9. Further, a housing for the motor 15 is supported by the second side wall portion 33 of the middle phalange section 9. Further, the rotary shaft 23 is supported by the first side wall portion 31 of the middle phalange section 9, and the second spur gear 27 is fixed to the first side wall portion 35 of the distal phalange section 7.

In this embodiment, a rotated position detection sensor (potentiometer) 38 that detects a rotated position of the distal phalange section 7 is attached to the second, side wall portion 33 of the middle phalange section 9, as shown in FIG. 4A. The rotated position detection sensor 38 can measure a rotated angle of the distal phalange section 7 relative to the middle phalange section 9.

Though not particularly shown, a storage space for containing electrical components of the sensor is formed at the tip of the finger. Then, a main body of a pressure sensor for measuring a contact pressure distribution on an outer surface of a palm-side portion of the distal phalange section 7 may be attached to that portion. With this arrangement, a pressure on the tip of the finger when the robot hand pinches an object can be measured. Control over a degree of pinching of the tip of the finger can be therefore performed according to the measured pressure.

In this embodiment, driving mechanisms for transmission to the joints J2,1 and J2,2 are the same as the driving mechanism for the joint J2,3. An interlocked wire mechanism constituted from wire pulleys not shown may also be employed. Since this interlocked wire mechanism is described in Japanese Patent Application Laid-Open Publication No. 117873/2003 in detail, a description of this interlocked wire mechanism will be omitted.

Figure 5:
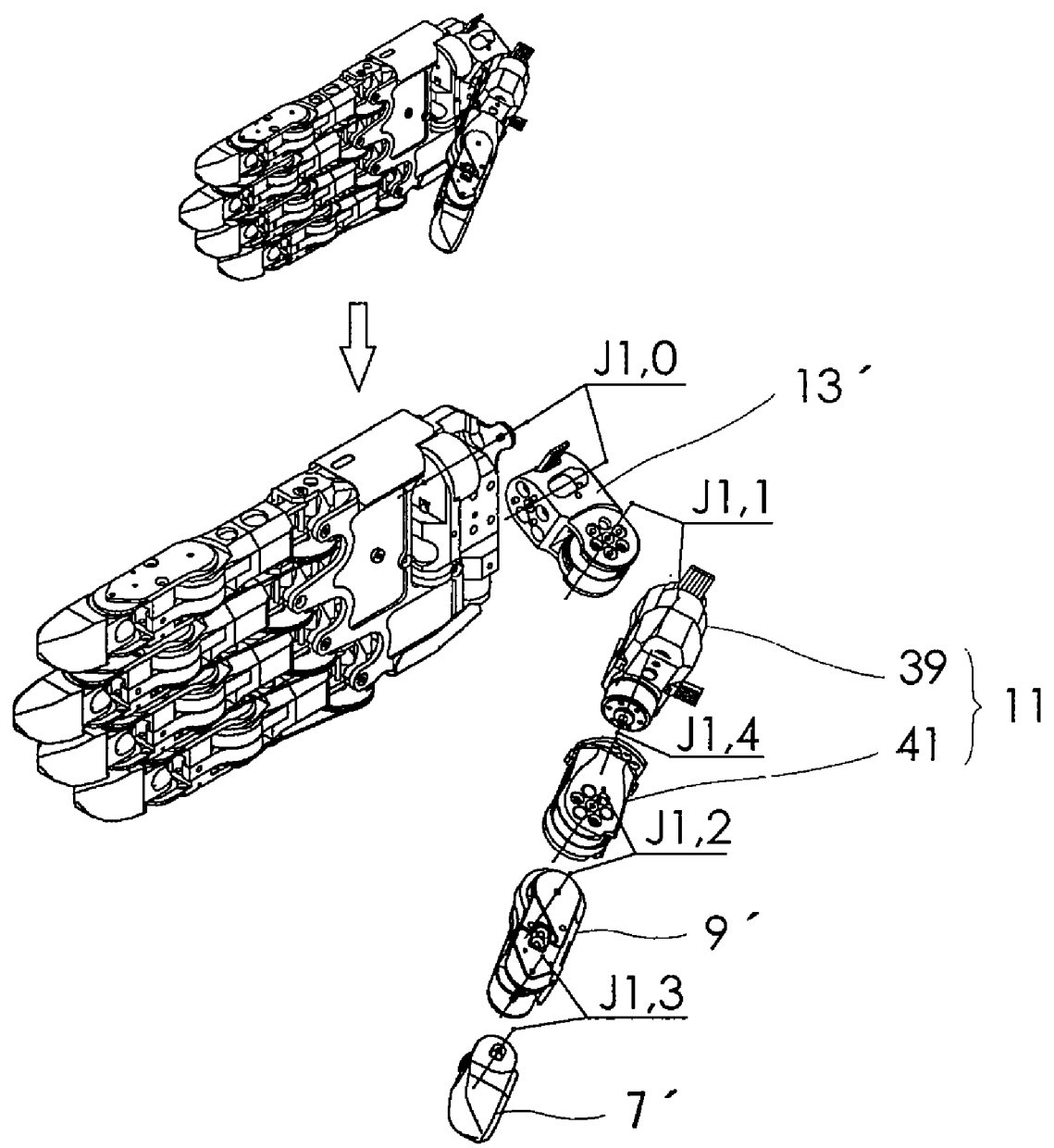
FIG. 5 is an exploded perspective view showing a configuration of a first finger.
Figures 6A, 6B:
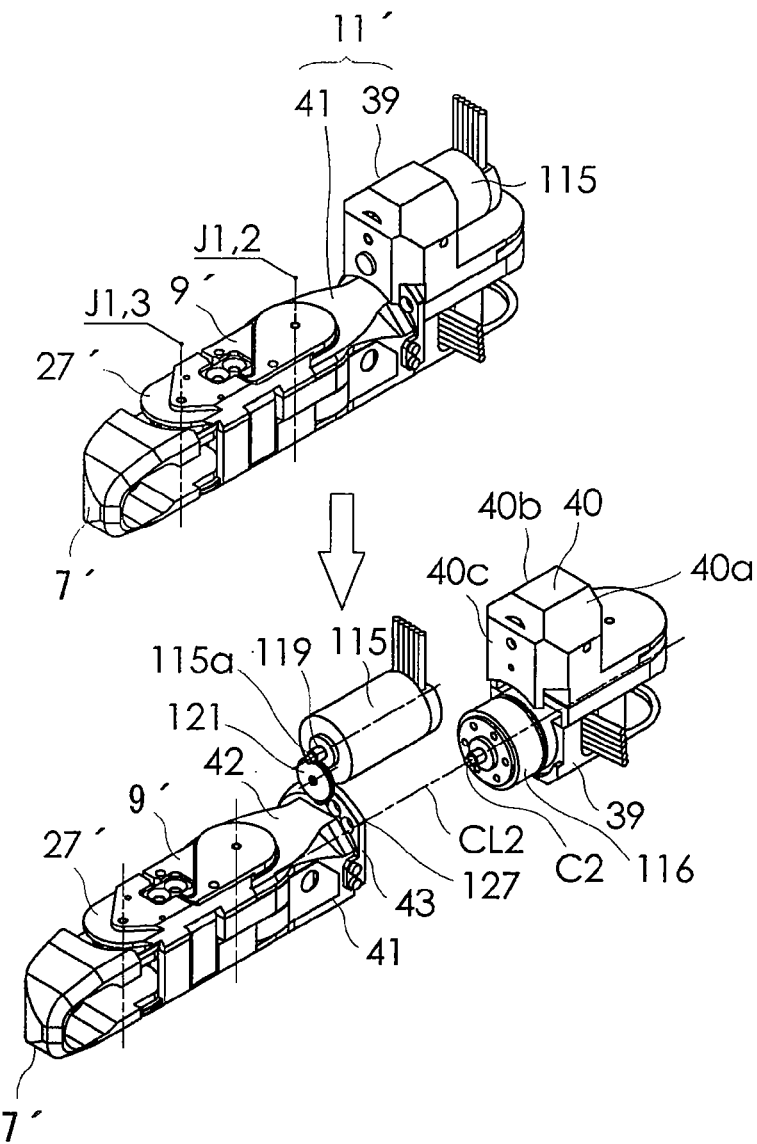
FIG. 6A shows a perspective view of the first finger.
FIG. 6B is an exploded perspective view of FIG. 6A.
Figure 7:
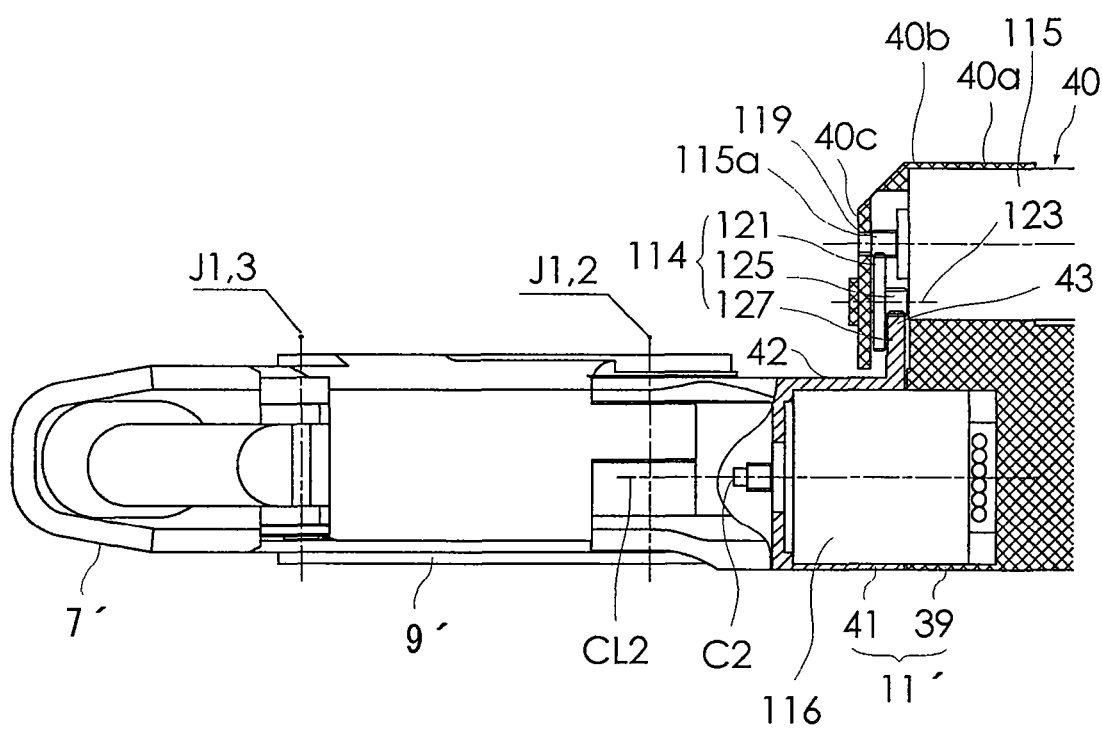
FIG. 7 is a side view of the first finger, in which part of a side of the first finger is shown as a sectional view.

Next, the finger mechanism for the first finger will be described with reference to FIGS. 2, 5, 6A, 6B, and 7. To the same components in these drawings as those in a configuration of the second finger shown in FIGS. 3 and 4, reference numerals obtained by assigning apostrophes to reference numerals shown in FIGS. 3 and 4, respectively, are assigned, and detailed descriptions of the same components will be thereby omitted. FIG. 5 is a perspective view of the robot hand, in which the first finger has been disassembled and then shown in order to describe configurations of phalange sections of the first finger. FIG. 6A shows a perspective view showing only the first finger, and FIG. 6B is an exploded perspective view of FIG. 6A. FIG. 7 is a side view of the first finger, in which only the proximal phalange section of the first finger is shown as a sectional view in order to describe a driving mechanism for the proximal phalange section of the first finger. Like the second through fifth fingers, the first finger is also constituted by four phalange sections, as shown in FIG. 5. The first finger is constituted by a distal phalange section 7', a middle phalange section 9', a proximal phalange section 11' (constituted by a first proximal phalange half portion 39 and a second proximal phalange half portion 41) and a metacarpal section 13', in order from the tip of the finger. In the first finger as well, as in the second through fifth fingers, a driving mechanism for independently rotating the distal phalange section 7' is arranged between the distal phalange section 7' and the middle phalange section 9'. Then, in this embodiment, the proximal phalange section 11' of the first finger is constituted by the first proximal phalange half portion 39 and the second proximal phalange half portion 41 obtained by dividing the proximal phalange section 11' of the first finger in a direction in which the proximal phalange section 11' and the metacarpal section 13' are arranged. The first proximal phalange half portion 39 is located on a side of the metacarpal section 13', while the second proximal phalange half portion 41 is located on a side of the middle phalange section 9'. Between the first proximal phalange half portion 39 and the second proximal phalange half portion 41, a rotary joint J1, 4 with a single degree of freedom that allows the second proximal phalange half portion 41 to rotate relative to the first proximal phalange half portion 39 within a predetermined angular range so that the second proximal phalange half portion 41 may rotate about a rotation center line CL2 that passes through the center of the first proximal phalange half portion 39 and the center of the second proximal phalange half portion 41 is provided. Then, between a motor 115 which will be described later and a wall portion 40c of an outer covering 40, a driving mechanism 114 for driving the rotary joint that causes the rotary joint J1, 4 to make a rotating motion within the predetermined angular range is provided. In order to implement a motion function for causing the first finger to face other finger (such as the second finger), a base of a human thumb root has two degrees of freedom. Likewise, respective independent driving mechanisms for two joints J1,0 and J1,1 are incorporated into the base of the first finger. That is, in order to implement two degrees of freedom, the metacarpal section 13' of the first finger includes the first joint J1,0 and the second joint J1,1 (shown in FIG. 2) having the independent driving mechanisms, respectively at a connecting portion between the metacarpal section 13' and a palm portion and a connecting portion between the metacarpal section 13' and the proximal phalange section 11', respectively. Then, in this embodiment, the rotary joint J1,4 with the independent driving mechanism is incorporated between the joints J1,1 and J1,2. This rotary joint J1,4 is provided so that the second proximal phalange half portion 41 can rotate relative to the first proximal phalange half portion 39, centering on an axis I (in FIG. 2) in which the joints J1,1, J1,2, and J1,3 are arranged linearly or the rotation center line CL2 (in FIGS. 6 and 7). When such an arrangement is adopted, by rotating the first finger between the first and second proximal phalange half portions, a palm-side portion of the distal phalange section of the first finger can be brought into direct contact with a palm-side portion of the finger other than the first finger. An object can be therefore pinched gently and stably.

Specifically, the driving mechanism 114 for driving the rotary joint is constituted by the motor 115 which is attached to the first proximal phalange half portion 39, and generates a driving force for rotating the rotary joint J1, 4 and a speed reducer 117 that reduces a speed of the motor 115 and transmits the reduced speed to the rotary joint. The motor 115 can be positive reverse rotated and is mounted to the outer covering 40 of the first proximal phalange half portion 39. The outer covering 40 includes a cover 40a that accommodates a half portion of the motor 115 on a side of an output shaft 115a. This cover 40a is constituted by a peripheral wall portion 40b which borders a main body of the motor 115 and the wall portion 40c that faces the output shaft 115a. The output shaft 115a of the motor 115 is rotatably supported by the wall portion 40c of the case 40a. The speed reducer 117 is constituted by a first pinion gear 119 fixed to the output shaft 115a of the motor 115, a first spur gear 121 that is fixed to a rotary shaft 123 rotatably supported by the wall portion 40c of the first proximal phalange half portion 39 and meshes with the first pinion gear 119, a second pinion gear 125 fixed to a rotary shaft 129, and a second spur gear 127 that is fixed to the second proximal phalange half portion 41 so that a rotation center C2 of the joint J1, 4 becomes the rotation center of the second spur gear 127 and meshes with the second pinion gear 125. The second spur gear 127 constitutes part of an outer covering 42 of the second proximal phalange half portion 41. That is, the second spur gear 127 is formed by carving teeth in an arc-like periphery portion of a flange 43 that protrudes from the outer covering 42. The motor 115 can rotate clockwise or counterclockwise around the rotary shaft 115a. Though the second spur gear may be provided as part of the second proximal phalange half portion 41 as in this embodiment, the second spur gear may be fixed to the second proximal phalange half portion 41 as a separate component.

As a driving mechanism for the joint J1,3 among the joints J1,0 to J1, 3 other than the joint J1, 4 of the first finger, the driving mechanism for the joint j2,3 described above is adopted. Then, conventional driving mechanisms of the first finger are adopted as the driving mechanisms for the joints J1,0 and J1,1 and a driving mechanism for the joint J1,2. By adopting the embodiment as described above, the same pinching mechanisms as those in the second through fifth fingers can be supplied to the first finger (i.e. portions corresponding to the driving mechanisms for the joints J1, 0 to J1, 3) as well. Thus, a pinching motion closer to that of a human being can be implemented.

In order to avoid extension or expansion of the proximal phalange section 11' by addition of the rotary joint J1, 4, a cylindrical case (in FIG. 6B) for a motor 116 for driving the joint J1, 2 that has been hitherto included in the proximal phalange section 11' can be used as a rotational shaft. In this case, the center line CL2 coincides with an axis line of the cylindrical case for the motor 116.

Figure 8A:
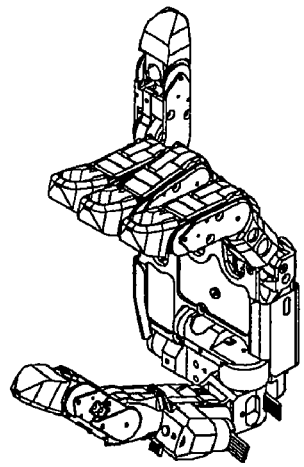
FIG. 8A is a diagram illustrating the robot hand of the present invention grasps an object to be held that is not shown.
Figure 8B:
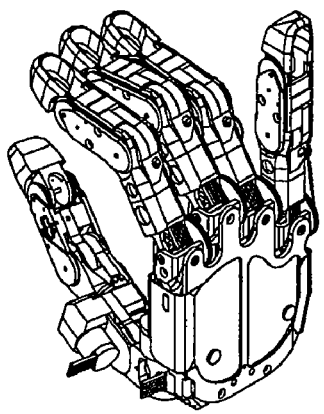
FIG. 8B is a diagram illustration the robot hand of the present invention grasps the object to be held that is not shown.
Figure 8C:
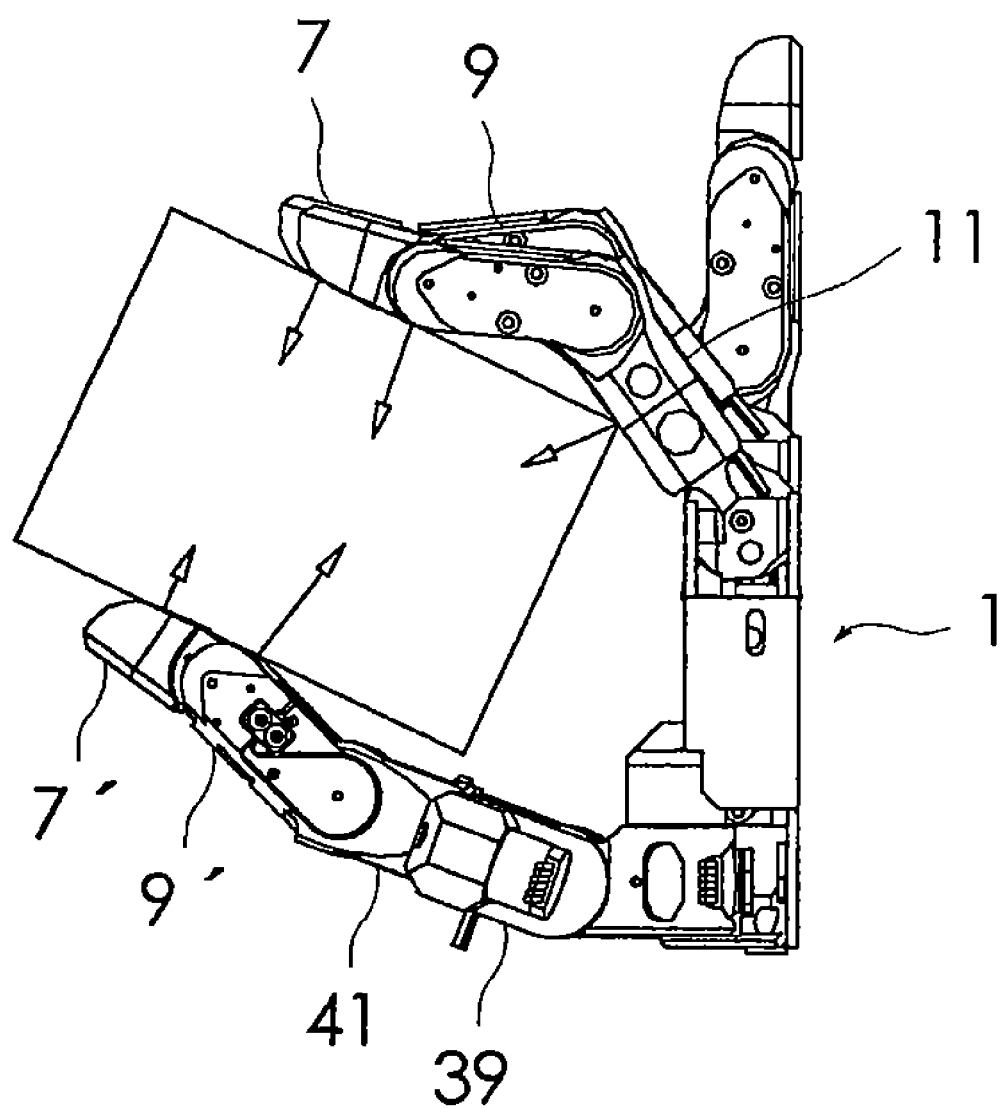
FIG. 8C is a diagram illustrating the robot hand of the present invention grasps the object to be held.
Figure 9A:
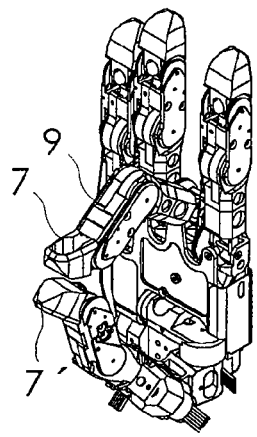
FIG. 9A is a diagram illustrating the robot hand of the present invention pinches an object to be held that is not shown.
Figure 9B:
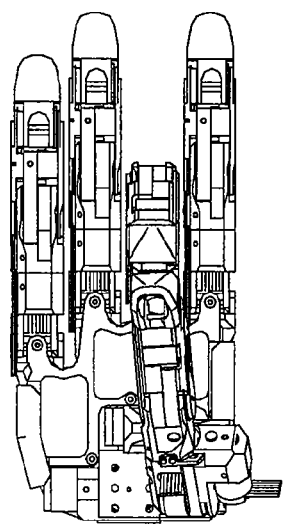
FIG. 9B is a diagram illustrating the robot hand of the present invention pinches the object to be held that is not shown.
Figure 9C:
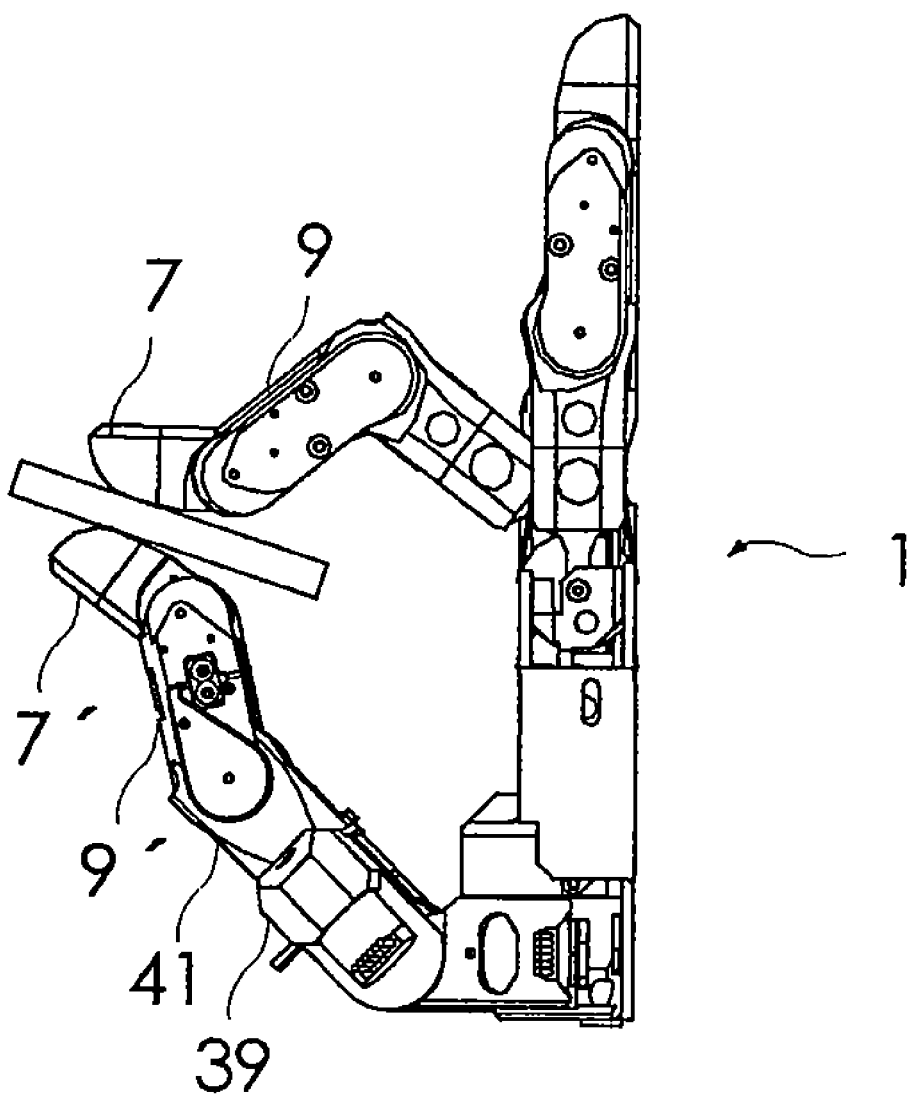
FIG. 9C is a diagram illustrating the robot hand of the present invention pinches the object to be held.

The above description was directed to a configuration of this embodiment. FIGS. 8 and 9 each show a shape of the robot hand in this embodiment when the robot hand is used to actually hold an object and a state in which the robot hand actually has held the object. In an example in FIG. 8, the object shaped like a box is held with the first finger and the third though fifth fingers. In each of the first finger and the third through fifth fingers, the distal phalange section 7 is rotated outwardly relative to the middle phalange section 9 by a predetermined angle. In the first finger, the second proximal phalange half portion 41 is rotated relative to the first proximal phalange half portion 39, and the palm-side portion of the distal phalange section 7' of the first finger fully faces the palm-side portions of the distal phalange sections 7 of the third through fifth fingers. As a result, the object is sandwiched by both of the entire palm-side portions of the distal phalange sections 7 and 7' and parts of palm-side portions of the middle phalange sections 9 and 9'. In this example, parts of palm-side portions of the proximal phalange sections 11 also come into contact with a corner portion of the object. Such a state cannot be obtained until the distal phalange sections 7 and 7' rotate outwardly relative to the middle phalange sections.

In an example in FIG. 9, a thin object is pinched by the first finger and the third finger. Even in this state, the distal phalange section 7' of the first finger and the distal phalange section 7 of the third finger are rotated outwardly relative to the middle phalange section 9' and 9, respectively, by a predetermined angle. In the first finger, the second proximal phalange half portion 41 is rotated relative to the first proximal phalange half portion 39 so that the palm-side portion of the third finger fully faces the palm-side portion of the first finger with the object sandwiched therebetween. As a result, in this example, the entire palm-side portions of the distal phalange sections of the first and third fingers can pinch the thin object gently and stably.

INDUSTRIAL APPLICABILITY

According to the present invention, an advantage can be obtained that a small object, a thin object, and a fragile object which could not be pinched conventionally can be pinched gently and stably.

The invention claimed is:

1. A robot hand including a plurality of finger mechanisms corresponding to a plurality of human fingers, respectively, each of said finger mechanisms being constituted by a plurality of phalange sections including a distal phalange section and a middle phalange section adjacent to the distal phalange section, said robot hand comprising:
   a fingertip rotating mechanism that causes the distal phalange section to rotate relative to the middle phalange section in two directions comprising an inward direction and an outward direction within a predetermined angular range, from a state where the distal phalange section is arranged in a straight line with the middle phalange section, and that includes at a connecting portion between the distal phalange section and the middle phalange section a single degree of freedom joint for allowing bending or stretching and also includes a driving mechanism that causes the joint to make a rotating motion within the predetermined angular range; and
   a rotation driving mechanism that causes a first finger mechanism corresponding to a human thumb among said finger mechanisms to rotate by a predetermined angle about a center line extending in a direction where the phalange sections constituting said first finger mechanism are arranged so that said first finger mechanism is fully facing the other finger mechanism, wherein
   the joint and the driving mechanism are configured so that the distal phalange section can be rotated relative to the middle phalange section in the two directions, namely, the inward direction and the outward direction within the predetermined angular range from the state where the distal phalange section is arranged in a straight line with the middle phalange section,
   the driving mechanism included in the fingertip rotating mechanism comprises a motor for driving the joint and a speed reducer, the motor for driving the joint being included in the middle phalange section and generating a driving force for rotating the joint, the speed reducer reducing a speed of the motor and transmitting the reduced speed to the joint, and
   the speed reducer comprises:
      a first pinion gear fixed to an output shaft of the motor,
      a first spur gear that is fixed to a rotary shaft rotatably supported by the middle phalange section and meshes with the first pinion gear,
      a second pinion gear fixed to the rotary shaft, and
      a second spur gear that is fixed to the distal phalange section so that a rotation center of the joint becomes a rotation center of the second spur gear and meshes with the second pinion gear.

2. The robot hand according to claim 1, wherein
each of the distal phalange section and the middle phalange section includes a first sidewall portion and a second sidewall portion facing to each other in a width direction thereof;
the joint is provided so that the first and second sidewall portions of the distal phalange section and the first and second side wall portions of the middle phalange section are rotatably jointed;
the motor is arranged between the first and second sidewall portions of the middle phalange section so that an axis line of the output shaft extends in the width direction;
an axis line of the rotary shaft that supports the first spur gear and a rotation center line of the second spur gear both become parallel to the axis line of the output shaft; and
the first spur gear is arranged to be along the first side wall portion of the middle phalange section and the second spur gear is arranged to be along the first side wall portion of the distal phalange section, respectively, the first side wall portion of the middle phalange section being located in a direction where the output shaft of the motor protrudes.

3. The robot hand according to claim 2, wherein
the output shaft of the motor is rotatably supported by the first side wall portion of the middle phalange section, and a housing for the motor is supported by the second side wall portion of the middle phalange section;
the rotary shaft is supported by the first side wall portion of the middle phalange section; and
the second spur gear is fixed to the first side wall portion of the distal phalange section.

4. The robot hand according to claim 3, wherein a rotational position sensor that detects a rotational position of the distal phalange section is attached to the second side wall portion of the middle phalange section.

5. The robot hand according to claim 1, wherein
said first finger mechanism includes the distal phalange section, the middle phalange section, and a proximal phalange section in order from a fingertip thereof;
the proximal phalange section includes a first proximal phalange half portion and a second proximal phalange half portion which are formed by dividing the proximal phalange section so that the first and second proximal phalange half portions may be located in a direction where the proximal phalange section and the metacarpal section are arranged;
the first proximal phalange half portion is located on a side of the metacarpal section, and the second proximal phalange half portion is located on a side of the middle phalange section;
between the first proximal phalange half portion and the second proximal phalange half portion, a single degree of freedom rotary joint is included, said rotary joint allowing the second proximal phalange half portion to rotate relative to the first proximal phalange half portion within the predetermined angular range so that the second proximal phalange section may rotate about the center line passing through a center of the first proximal phalange half portion and a center of the second proximal phalange half portion;
a driving mechanism for driving the rotary joint that causes said rotary joint to make a rotating motion within the predetermined angular range is also included; and said rotary joint and said driving mechanism for driving the rotary joint comprise said rotation driving mechanism.

6. The robot hand according to claim 5, wherein said driving mechanism for driving the rotary joint comprises a motor for driving the rotary joint attached to said first proximal phalange half portion and a speed reducer that reduces a speed of said motor and transmits the reduced speed to said rotary joint, said motor generating a driving force for rotating said rotary joint; and said speed reducer comprises:

a first pinion gear fixed to an output shaft of said motor;

a first spur gear that is fixed to a rotary shaft rotatably supported by said first proximal phalange half portion and meshes with said first pinion gear;

a second pinion gear fixed to said rotary shaft; and a second spur gear that is fixed to said second proximal phalange half portion so that a rotation center of said rotary joint becomes a rotation center of said second spur gear and meshes with said second pinion gear.

7. The robot hand according to claim 1, wherein a pressure sensor for measuring a contact pressure distribution is attached to an outer surface of a palm-side portion of the distal phalange section.

* * * * *